United States Patent [19]
Fridley et al.

[11] Patent Number: 6,005,486
[45] Date of Patent: *Dec. 21, 1999

[54] TELEVISION CONTROL SYSTEM FOR UNIVERSAL CONTROL OF HOSPITAL TELEVISIONS

[75] Inventors: Duane Patrick Fridley, Indianapolis, Ind.; Steve Allen Dixon, Hamilton, Ohio; Vern Palm, Batesville; Richard J. Schuman, Brookville, both of Ind.

[73] Assignee: Hill-Rom, Inc., Batesville, Ind.

[*] Notice: This patent issued on a continued prosecution application filed under 37 CFR 1.53(d), and is subject to the twenty year patent term provisions of 35 U.S.C. 154(a)(2).

[21] Appl. No.: 09/157,760

[22] Filed: Sep. 21, 1998

Related U.S. Application Data

[63] Continuation-in-part of application No. 08/853,532, May 9, 1997.

[51] Int. Cl.[6] ................................................. G05B 19/02
[52] U.S. Cl. .................... 340/825.22; 370/447; 348/734; 340/825.69; 340/825.72
[58] Field of Search ........................ 340/825.22, 825.72, 340/825.69; 348/173, 175, 176, 734; 359/142; 379/102; 370/447

[56] References Cited

U.S. PATENT DOCUMENTS

| | | |
|---|---|---|
| 3,913,153 | 10/1975 | Adams et al. . |
| 4,623,887 | 11/1986 | Welles, II . |
| 4,626,848 | 12/1986 | Ehlers . |
| 4,680,790 | 7/1987 | Packard et al. ..................... 379/432 |
| 4,703,359 | 10/1987 | Rumbolt et al. ..................... 358/194.1 |
| 4,780,919 | 11/1988 | Harrison . |
| 4,802,114 | 1/1989 | Sogame . |
| 4,825,200 | 4/1989 | Evans et al. . |
| 4,866,434 | 9/1989 | Keenan . |
| 4,905,279 | 2/1990 | Nishio . |
| 5,028,919 | 7/1991 | Hidaka . |
| 5,128,667 | 7/1992 | Enomoto . |
| 5,235,258 | 8/1993 | Schuerch . |
| 5,386,251 | 1/1995 | Movshovich . |
| 5,519,457 | 5/1996 | Nishigaki et al. . |
| 5,542,138 | 8/1996 | Williams et al. . |
| 5,544,376 | 8/1996 | Fromson . |
| 5,619,190 | 4/1997 | Duckworth et al. ............... 340/825.22 |
| 5,680,115 | 10/1997 | Sim . |
| 5,715,020 | 2/1998 | Kuroiwa et al. . |
| 5,729,210 | 3/1998 | Kiriyama . |
| 5,737,107 | 4/1998 | Umeda . |
| 5,745,068 | 4/1998 | Takahashi et al. . |

OTHER PUBLICATIONS

National Electrical Manufacturers Association, Standard for Hospital Grade Television Wired Interfaced to Pillow Speaker and/or Bed Rail Control, NEMA Standards Publications 3–SB–, Rosslyn, Virginia, 1996, pp. 1–15.

*Primary Examiner*—Michael Horabik
*Assistant Examiner*—Anthony A. Asongwed
*Attorney, Agent, or Firm*—Wood, Herron & Evans, LLP

[57] ABSTRACT

A television control system for controlling different models of hospital televisions, has an input device for receiving an input from a person, and a controller for interfacing with hospital televisions. The controller generates control signal clusters reflective of the input, and the clusters include a plurality of sequentially-generated, individual control signals for specific operational functions of a plurality of different models of hospital televisions.

19 Claims, 8 Drawing Sheets

TELEVISION CONTROL SYSTEM FOR UNIVERSAL CONTROL OF HOSPITAL TELEVISIONS

RELATED APPLICATIONS

This application is a continuation-in-part of pending application Ser. No. 08/853,532, entitled Television Control System for Universal Control of Hospital Televisions, and filed May 9, 1997, which application is incorporated completely herein by reference.

FIELD OF THE INVENTION

This invention relates generally to hospital interfacing devices and particularly to an interface device for controlling a television in a hospital room.

BACKGROUND OF THE INVENTION

Televisions (TVs) manufactured for use in health care facilities, such as within hospital rooms, are specifically designed for use within those environments. In the past, such televisions have been designed to meet certain requirements regarding safety and control. However, such hospital TV control has always been subject to an informal control standard directed to the patient operation of the TVs from a hospital bed rail control or a pillow speaker. The term "pillow speaker" is generally used to refer to a device associated with a hospital bed which provides an audio speaker and volume control for a television, along with capabilities for communicating with the nurse, controlling lighting, and other such features. The pillow speaker is generally a detached unit connected by a cord to the bed or to an interface plug in the wall.

While available hospital TVs and their associated controls provide a basic viewing experience, they suffer from several significant drawbacks. Historically, the control of hospital TVs has been severely limited and has generally consisted of a single button control which turns the television ON and OFF and changes the channel. Separate volume control buttons are used for raising or lowering the volume of the television. For example, such TVs are turned ON by pressing the TV button. Then, each subsequent depression of the TV button changes the channel UP to the next available viewing channel. When all the available channels are displayed in sequence, the television then turns OFF. Depressing the TV button again turns the television back ON and prepares it again for moving UP through the channels. The patient or other person controlling the TV can only progress upwardly through the channels. If a desired channel is passed, the patient has to progress all the way through the channel selections, has to turn the TV OFF and then ON again, and finally has to move up slowly through the channels, being careful to again not pass the desired channel. Furthermore, a patient cannot turn the TV OFF at a selected channel and then turn it back ON at that channel. The TV always comes back ON at the same channel and the patient has to again search for the channel they were previously viewing.

Such scenarios are not only frustrating and a waste of the patent's time, but also may unduly and undesirably aggravate the patient, whose health may not be at its best. While such control may have been at least sufficient when only a few channels were available for viewing, the latest TV technology requires additional control for accessing a large number of additional channels and operating an expanded set of TV features and functions. For example, it is desirable to turn the television ON and OFF and have it remain at the channel which was last selected. Furthermore, it is desirable to move UP or DOWN through the available channels at random. Still further, it is desirable to access a number of other TV features, such as display menus or channel viewing guides. Newly available hospital TVs, often referred to as code-driven TVs, are capable of being functionally controlled as desired and discussed above. However, current hospital TV control technology is usually only able to provide the limited control that has traditionally been available with a hospital TV and often cannot take full advantage of the code-driven TV technology.

Another significant drawback of available hospital TV control technology is that each bed and pillow speaker associated with the bed must be configured to control a specific brand/model of hospital TV. There are currently at least three major manufacturers of hospital TVS. To control a specific TV brand/model from a hospital bed and pillow speaker, the bed and pillow speaker have to be specially manufactured and configured for that TV model.

As such, a hospital or other health care facility has to know which beds are going to go with which TV models, and the manufacturer of the beds has to tailor and configure the bed operation for the specific TV model. Oftentimes, such configuration is required in the field, which further increases the manufacturing costs associated with each bed. After the beds and TVs are installed, a bed cannot be moved to a room having a different TV model than the one for which it is manufactured and configured. Otherwise, the TV cannot be controlled from the bed. As may be appreciated, this presents significant logistical problems for the hospital in setting up a hospital room. Furthermore, it presents delays in implementing a bed into a room, because if the bed and TV do not communicate, then the hospital has to obtain a different bed, or a different TV model or has to have the bed reconfigured for the specific TV model available.

The present hospital TV control scenario is also unsuitable for hospital bed manufacturing. Manufacturers have to keep different beds in inventory, or have to specifically tailor or retrofit each bed to the customer's TV demands. Such retrofitting is often done by the bed manufacturer in the field. This is not only costly in the way of increased inventory costs and post production modifications, but it also creates another issue for manufacturers' Customer Service Departments to handle.

Furthermore, not only do the above problems and drawbacks arise when a new hospital room is being set up, but they will again occur if there is a malfunction in the bed, in the TV, or both. Replacement beds or TVs cannot simply be taken from other rooms unless the hospital only has one type of bed and one model of television.

Any solution to the above drawbacks in current TV control technology must not only take into account the newer code-driven hospital TVs, but must also be compatible with older TVs that will probably remain in a particular hospital until they malfunction or the hospital makes a determination to upgrade to newer TVs. Given the interest in rising health care costs, the former situation may occur before the latter.

Radio capabilities are also usually available with some hospital TVs. In the past, the bed rails and pillow speakers have had separate, generally single button, RADIO controls for turning the radio ON and OFF and changing the radio channels. Furthermore, radio control was limited like the TV control. Therefore, any suitable solutions to the drawbacks of the current TV control technology should also be capable of utilizing available radio features of a television, whether an older TV model or a newer, code-driven model.

One solution to the aforementioned problems in the prior art, is addressed by U.S. patent application, Ser. No. 08/853,532, referenced above, wherein a television control system for universal control of hospital televisions is provided, addressing the problems associated with various TV models from different manufacturers, as well as scenarios wherein a hospital will include both older and newer televisions. Specifically, the television control system utilizes various operational modes for adapting the system to a variety of different situations. For example, the inventive system may be adapted to hospitals containing both old and newer TVs, to hospitals containing only newer TVs and/or to hospitals containing only old TVs. Furthermore, the system may be adapted, through mode selection, to address a number of other possible scenarios within a hospital. While such mode selection is desirable and the inventive system addresses the problems in the prior art, it requires proper switch selection for the desired mode upon installation. Accordingly, the proper switch selection requires an individual to recognize which TVs are in use within a particular room or within a particular hospital or medical facility. Such a determination may slow the installation procedure.

Furthermore, the previously mentioned system, in one embodiment, relies upon patient operation of the various input buttons to switch between sub-modes. It has been determined that such a process for selecting a mode could sometimes lead to the inadvertent selection of control for an older style TV when control of a newer TV is actually desired, or vice versa. Such mode selection would rely upon all users intuitively operating the system in the same manner. In the worse scenario, the various submodes of the system might be changed inadvertently and undesirably.

Accordingly, it is an objective of the present invention to address the drawbacks in available hospital TV control scenarios, and to provide an improved TV control system for medical and health care facilities, such as hospitals.

It is a further objective of the present invention to provide a TV control system which adapts to TV models from a variety of different manufacturers.

It is still a further objective of the present invention to have a bed-dedicated TV control unit and bed which may be moved between areas in the hospital without being dependent upon the model of TV with which it is interfaced.

It is another objective of the present invention to provide expandability of TV control functions in a hospital for easily accessing additional channels and addressing additional features available with current TV technology.

It is still a further objective to provide expanded control capabilities for newer hospital TVs while at the same time maintaining compatibility with older TVs which are currently in place in various hospitals.

It is another objective of the invention to improve upon the existing inventive control system which addresses the above objectives and to specifically reduce or eliminate manual switching or patient control for operation of various older and newer style TVs with the system.

It is another objective to provide suitable radio control within the TV control system.

These and other objectives will become more readily apparent from the Summary of the Invention, Brief Description of the Drawings, and Detailed Description of the Invention, below.

SUMMARY OF THE INVENTION

The present invention addresses the above-discussed drawbacks of the prior art and meets the objectives set forth above and other objectives by providing a TV control system which universally controls different models of hospital TVs. In that way, a bed, or pillow speaker, which is outfitted with the invention may be utilized with any one of a number of different hospital TV models from different manufacturers without having to be specially designed or configured for a particular TV model. The television control system allows a bed or pillow speaker to be moved between areas in the hospital without being dependent upon the model of TV with which it is interfaced. The inventive system further provides expanded functional capability for controlling a hospital TV while maintaining compatibility with older TVs and providing for suitable radio control of radio functions available on a particular TV model. By providing universal control of different TV models, the invention reduces the logistical problems between hospital and bed manufacturers when ordering, manufacturing, and installing hospital beds. Furthermore, the invention gives a hospital greater flexibility in moving and replacing hospital beds and hospital TVs. Manufacturers do not have to maintain a large inventory of different beds configured for specific TV models, thus reducing inventory costs and post production costs associated with retrofitting or configuring beds in the field for specific TV control. Furthermore, the invention gives a patient greater flexibility and control of the TV and eliminates the inconveniences and irritations associated with prior hospital TV systems.

To that end, the TV control system of the invention comprises an input device which is operable for interfacing with a person to receive an input, and is further operable for generating an input signal corresponding to the input. The input device may be in the form of buttons or switches on the side rail of a hospital bed or may be incorporated into the control buttons or switches of a pillow speaker associated with the bed. The input device essentially provides an indication to the patient of the type of control available for the hospital TV and possibly a radio system associated therewith. The system further comprises a controller which is configured for interfacing with the hospital TV. The controller is operable for generating the necessary control signals to operate different models of hospital TVs. The controller not only provides control signals for newer code-driven TVs, but is still capable of controlling older TVs which are in place in existing hospital facilities. The controller is operably coupled to the input device to receive one of a plurality of available input signals, such as an input from the patient to turn the television ON or OFF or to change channels.

In accordance with the principles of the present invention, the controller is operable for generating a control signal cluster reflective of the input signal to control the TV as desired by the patient. The control signal cluster includes a plurality of sequentially generated, individual control signals, which are sent one after the other. Each of the control signals corresponds to a specific operational function for a plurality of different models of hospital TVs. Therefore, the sequentially generated control signals of each cluster reflect the desired operational function of the patient.

For example, when the patient pushes the TV ON button, the controller of the inventive system generates a control signal cluster which has a plurality of sequentially generated ON commands, one ON command for each TV of a plurality of different models of hospital TVs which may be coupled to the system. That is, if the system is configured for controlling television Model A, Model B, and Model C, each from different manufacturers, then the inventive system provides a control signal cluster including ON signals for Model A, Model B, and Model C for turning the TV on. The sequentially generated ON signals proceed one after the other. If the bed containing the inventive system is coupled with a Model B TV, then the TV will simply ignore the ON control signals for Model A and Model C, and will respond to the Model B signal by turning itself on. Since the control signal cluster includes sequentially generated control signals for a plurality of different models of hospital TVs, then the bed and inventive control system may be moved to a room with a different TV model, such as a Model A TV, and the control system will be able to properly operate that model as well without any reconfiguration of the control system.

Preferably, a particular input signal will produce a control signal cluster which corresponds to the same operational function for each TV model with which the system might be interfaced. For example, an ON input from the patient will generate a cluster of only ON signals for the TVs. However, in accordance with another principle of the present invention, the cluster might include individual control signals for different operational functions. For example, for one TV model, the cluster may include control signals to provide radio features from the TV, while for another TV model, and within the same cluster, the control signal might operate the TV to provide a channel guide showing the available viewing channels. It will be appreciated by a person of ordinary skill in the art, that other features might be included in a cluster depending upon the operational functions of the available TV models.

In one embodiment of the invention, inputs are provided for turning the television ON/OFF, for moving the viewing channel UP, and for moving the viewing channel DOWN, while another button corresponds to a SELECT or RADIO feature of the TV model. The ON/OFF, UP, and DOWN, are the basic functions which most patients will utilize when operating a hospital television. However, it will be appreciated that other operational functions may be utilized and thus the input device may provide the appropriate switches or buttons to access those additional functions.

The present invention is capable of operating newer, code-driven TVs, and is also capable of operating older TVs under the older command protocol. To that end, one embodiment of the present invention operates in a variety of different modes depending upon whether old TVs, newer code-driven TVs, or a combination of both are to be encountered by a bed which is outfitted with the inventive control system. To that end, the invention comprises a mode switch which is coupled to the main processor of the system for determining the selected mode. The mode switch may be utilized to set the system into a particular mode depending upon the installation parameters and the TVs available.

In another embodiment of the invention, a mode switch and different selectable modes are eliminated. In the alternative embodiment, the invention takes advantage of the backward compatibility of newer TVs which are compatible to the older command protocol, so that the newer TVs may be installed in hospitals where only the older command protocol is available. To that end, the control signal cluster, which is generated in accordance with the principles of the present invention, may include the command signals for the older protocol, as well as the new control signals for the newer TVs. Specifically, the cluster initially includes control signals for the newer TVs, and if the TV does not respond, a data stream for operating an older TV is added to the cluster. In that way, the older TVs are essentially handled as if they were a TV from another manufacturer. Furthermore, no mode switching or mode selection is necessary by either the installer or a patient utilizing the inventive system. In such an alternative embodiment, the backward compatibility of newer TVs is also taken into account, so that a selected function, such a CHANNEL UP function, is always generated under the older command protocol. All TVs, older and newer, will recognize certain function control signals, such as a CHANNEL UP control signal, based upon the older command protocol. Preferably, in accordance with such an alternative embodiment, the cluster of control signals is repeated at regular intervals if a particular input is repeatedly engaged and the individual control signals are appropriately separated by time delay intervals to allow correlated functions to occur at a similar rate. For example, the CHANNEL UP control signals and CHANNEL DOWN control signals are repeated at the same intervals so that the channels may be scrolled up and down at generally the same rate.

In one embodiment of the invention, the controller utilizes a plurality of relays to generate the control signal cluster. The relays are coupled to the system processor, and they are opened and closed as directed by the processor to form a series or string of spaced pulses which create the specific control signals for a particular TV model. Through selective operation of the relays, the control signals, and control signal clusters are created as necessary for operating a hospital TV. The relays are also bi-directional and not sensitive to polarity errors that may occur upon installation of the system. The features and advantages of the invention will become further apparent from the Brief Description of Drawings and the Detailed Description of the Invention below.

DETAILED DESCRIPTION OF THE INVENTION

Figure 1:
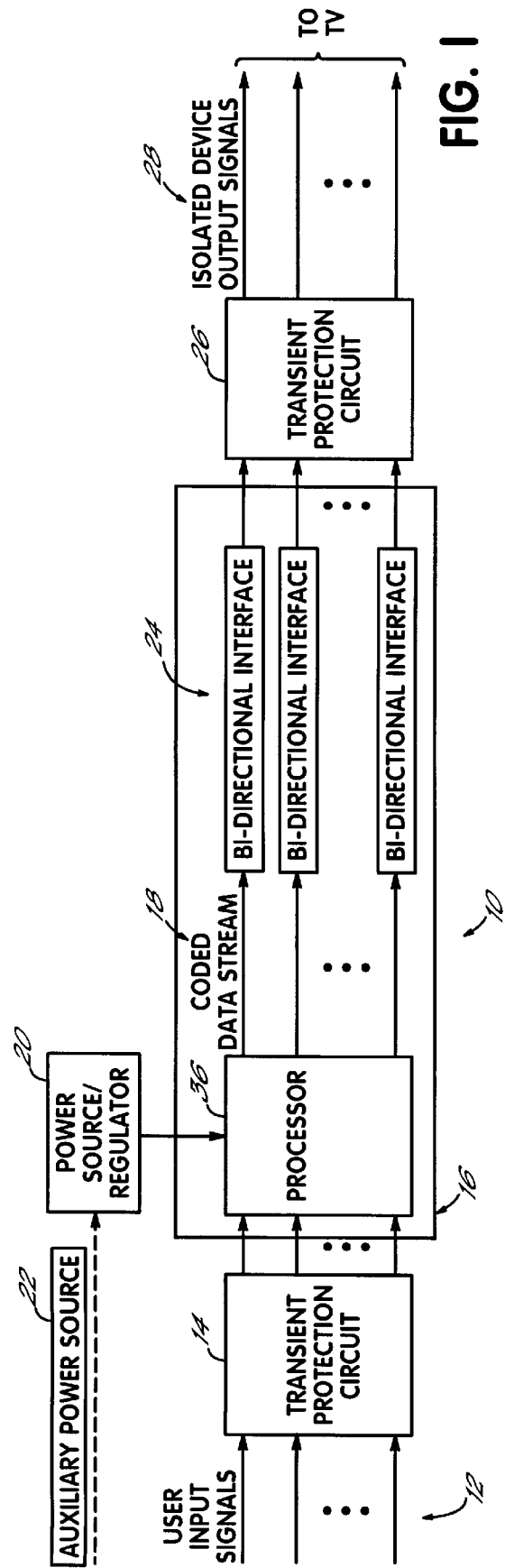
FIG. 1 is a block diagram of an embodiment of the Universal Television Control System of the present invention.

FIG. 1 is a block diagram of a system for use in a hospital or other health care facility implementing the universal television control system of the invention. System 10, illustrated in FIG. 1, provides the necessary interface between the patient, the bed, the control system, and the TV. System 10 implements a plurality of user inputs 12 which are preferably provided by the bed rail circuitry of a hospital bed or the circuitry of a pillow speaker. In currently available hospital beds and pillow speakers with TV control systems, control buttons are available for operating the bed, operating the television, calling a nurse or other attendant, and a variety of other functions associated with hospital beds. While the input devices are traditionally bed rails and pillow speakers, other input devices might be used.

Transient protection circuitry 14 is utilized for isolating the system controller 16 from a user input device to prevent electrical shock and other hazards to a patient or other user, and also to protect the controller circuitry. The controller 16, discussed in greater detail hereinbelow, includes a processor 36 which provides the necessary signals, in the form of a coded data stream on output lines 18 for controlling a bi-directional interface and ultimately for controlling the hospital TV in accordance with the principles of the present invention. Controller 16 is preferably coupled to an appropriate power source and regulator circuitry 20, such as power from a hospital bed. System 10 also preferably includes an auxiliary power source 22, such as battery, when a more standard source of power is not available. The coded data stream signals 18 operate bi-directional interface circuitry 24 which provides proper operational coupling between the TV and processor 36 of controller 16. Transient protection circuitry 26 is also preferably positioned between the bi-directional interface circuits 24 and the TV. In that way, a series of isolated TV control output signals 28 are provided to the TV. Controller 16 circuitry of system 10 is thus electrically isolated both from the TV and the user input devices for protecting the controller 16 circuitry.

Figure 2:
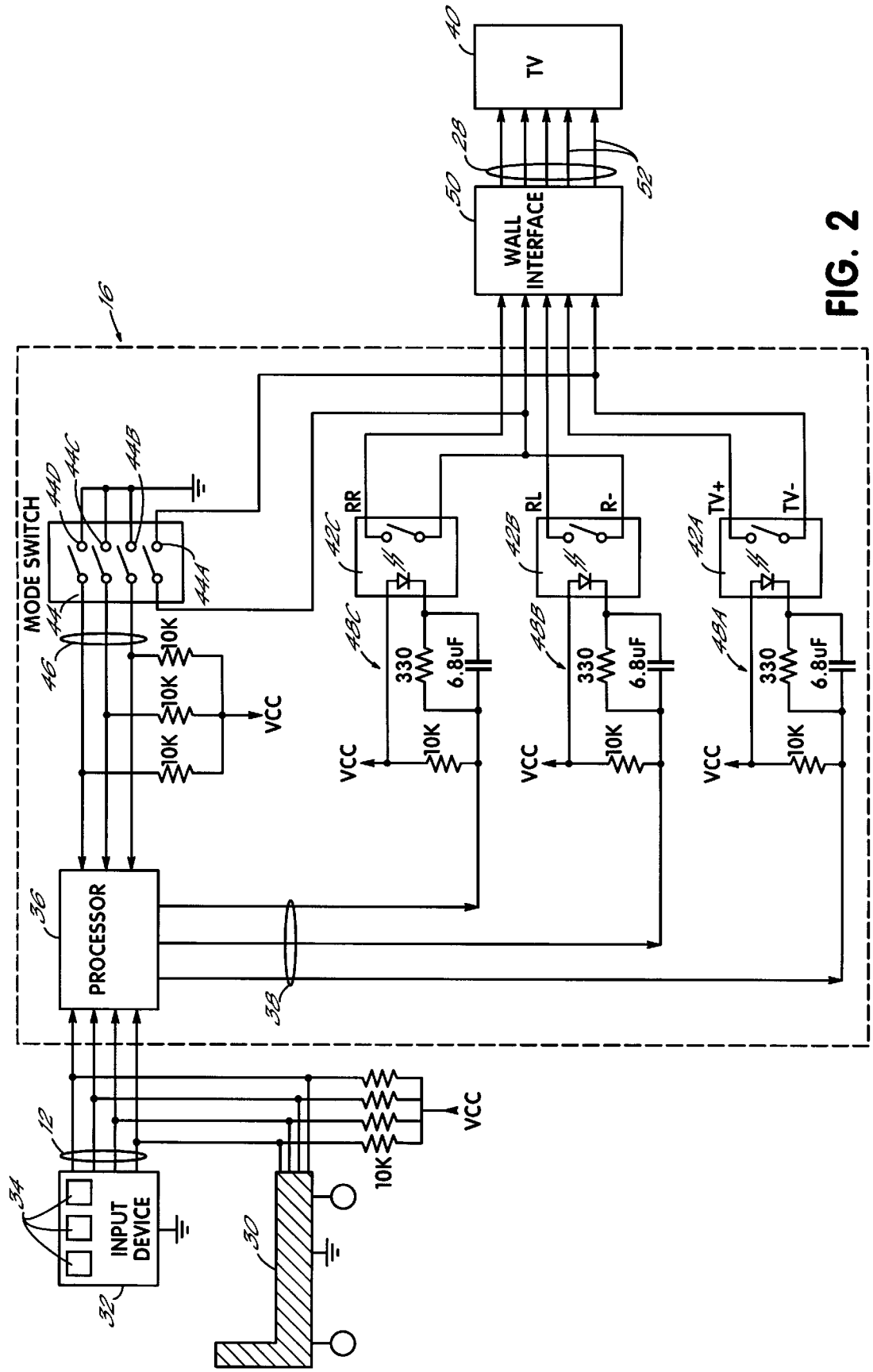
FIG. 2 is a circuit schematic of the System in FIG. 1.

FIG. 2 is a circuit schematic diagram for the controller 16 of system 10 illustrated in FIG. 1. In accordance with the principles of the present invention, a patient or other person is able to control a variety of different TV models using input buttons, switches, or other devices on a hospital bed rail, pillow speaker, or similar input device. Throughout this application, the term "models" used in referring to the different types of hospital TVs which are available, refers both to different brands of hospital TVs made by different manufacturers, such as RCA/GE, Zenith, and Magnavox/Philips, and also refers to the different types of models which may be available from any one manufacturer but which may require a different control protocol.

To control the hospital TV in accordance with the principles of the invention, user inputs or input signals 12 are provided to controller 16 from the existing TV control circuitry of a hospital bed 30, or from another input device 32, such as a pillow speaker. For example, a user input might be the operation of a button, switch or other device on the bed or pillow speaker. The TV control input circuitry of a bed will generally be located at the available left and right side rails of the bed (not shown) as is conventional. However, it will be understood that other locations on the bed may also be suitable for the TV control input circuitry. The input circuitry preferably includes a number of input buttons/switches 34, as shown on the pillow speaker 32, which may be pressed or activated by a patient. It is also conventional to locate TV control buttons on the pillow speaker. While the pillow speaker 32 and bed 30 may be used exclusive of each other for TV control, a pillow speaker will generally be provided with the bed, and in such a case, the inputs from the various devices may be operably tied together as illustrated in FIG. 2. The various available user inputs will preferably generate input signals. FIG. 2 shows four input lines which make up the user input signals 12. However, a lesser or greater number of inputs, input signals and appropriate lines may be provided depending upon the number of input buttons/switches 34 utilized with the bed or pillow speaker and the desired control of the TV.

Controller 16 further comprises a processor 36 which is preferably an integrated circuit micro-processor, such as Model No. PIC 16C84 available from Microchip, Chandler, Ariz. Alternatively, the processor 36 might include a programmable logic array (PLA) which is specifically configured for use within the controller 16 in accordance with the principles of the present invention. The processor 36 is operably coupled to the input devices 30, 32 for receiving input signals 12 therefrom which correspond to the input buttons/switches 34 accessed by the patient. The processor reads the user input signals 12, and depending upon the processor's operational mode, as discussed further hereinbelow, processor 36 will generate output signals 38 (coded data stream 18 from FIG. 1) which are used for ultimately producing the output signals or control signals 28 necessary for controlling a hospital TV 40 coupled to system 10 of the invention.

In the preferred embodiment of the invention, the processor 36 is coupled to bi-directional interface circuitry 24 comprising a plurality of relays 42a, 42b, and 42c. The relays are utilized for producing the TV control signals 28. Three relays are illustrated and discussed herein; however, it will be understood by a person of ordinary skill in the art that a different number of relays might also be utilized depending upon the number of control signals 28 which are desired for controlling the hospital TV 40. Therefore, the system is expandable both with respect to user inputs and output control signals. Suitable relays are solid state relays HP HSSR 8400 available from Hewlett-Packard.

In one embodiment, processor 36 is also coupled to a mode switch 44 for controlling the operating mode of the processor. Mode switch 44 may be a dip switch with a plurality of individual switches to provide a plurality of different switch states or signals. For example, mode switch 44 illustrated in FIG. 2 has four individual switches 44a, 44b, 44c, and 44d and thus is capable of providing a number of binary states or mode signals 46 to processor 36. As illustrated in FIG. 2, three of the mode signals 46 (from switches 44b, 44c, and 44d) are coupled directly to processor 36 while the other mode signal or output from mode switch 44a is used to couple two control signal lines together. Again, it will be understood that mode switch 44 may be capable of initiating greater than 16 modes in controller 16 in accordance with the principles of the present invention. Also, in another embodiment of the invention, a mode switch may not be necessary, as discussed below.

Relay support circuitry 48a, 48b, and 48c is coupled between the processor 36 and output signals 38 and the respective relays 42a, 42b, and 42c. The support circuitry provides a high drive current to each of the relays for creating the TV control signals 28. That is, the relays create the actual control signals 28 for the TV under the command and operation of processor 36 and output signals 38. Preferably the relays 42a, 42b, and 42c are optical relays which provide an optical isolation between output control signals 28 and the processor 36 and input circuitry 30, 32. In the embodiment disclosed herein, relay 42a is primarily utilized for the traditional TV functions of TV 40. Relays 42b and 42c are utilized for radio functions associated with TV 40.

More specifically, the output lines of 42a designated TV+ and TV− are used to send the appropriate control signals to TV 40, and thus are appropriately coupled to the TV. The relays 42a, 42b, and 42c are polarity independent and thus provide the bi-directional interface 24 of controller 16. TV 40 would generally be coupled to the controller 16 through an appropriate wall interface 50 (see FIG. 1). In conventional systems, it is necessary to ensure that the polarity of TV lines 52 coupled between TV 40 and the wall interface 50 was proper because the control lines TV+ and TV− on the other side of the interface 50 are polarity dependent. However, since the relay 42a will simply connect or disconnect the lines TV+ and TV− in a controlled fashion to send the appropriate control signals 28, the lines are bi-directionally coupled and the polarity of lines 52 may be switched and the system 10 of the invention will still operate properly. This provides a significant advantage over prior systems, which were susceptible to being improperly wired, thus preventing proper operation of the TV.

Depending upon the mode of operation, relays 42b and 42c are utilized to provide radio control signals for a wired radio, or alternatively, channel UP and DOWN signals for some hard-wired TV models such as that provided by Zenith. Again, mode switch 44 provides a selection of different modes of operation for processor 36, and additional relays may be added to the inventive system to address the need for additional TV control signals.

The present system would be operational for a variety of different hospital TV models including, but not limited to, the following:

RCA and GE televisions currently manufactured by Thomson Consumer Electronics, including RCAJ250520 20 inch TVs and GE20GH550 20 inch TVs and later hospital grade models;

Magnavox and Philips TVs currently manufactured by North American Philips, including Magnavox KJ92-20P 20 inch TVs and Philips HC9520C 20 inch TVs and later hospital grade models;

Zenith TVs manufactured by Zenith Sales Inc. including Zenith H2057DT 20 inch and later hospital grade models.

The system is also suitable for adaptation to future code-driven hospital-grade TVs and also operates older TVs currently used with the conventional TV control protocol.

The newer hospital grade TVs are code-driven and thus operate according to a plurality of different control codes which are sent to the TV. Old TVs are generally not code-driven. For operating one of a number of code-driven TVs, controller 16 produces a control signal cluster comprising a plurality of control signals in accordance with the principles of the present invention. More specifically, the control signal cluster includes a plurality of sequentially generated, individual control signals which correspond to the specific operational functions of a plurality of different models of hospital TVs. The control signals are sent to the TV one after the other. The inventive system thus will automatically operate any one of a variety of different models of hospital TVs in response to a patient input. Furthermore, in an alternative embodiment, both newer and older TVs may be operated with a single control signal cluster.

The cluster preferably includes a particular control signal for each of the TV models that may be used with the invention and alternatively, may include control signals for older TVs. The particular TV model interfaced with a hospital bed or pillow speaker receives the control signal cluster and will recognize and utilize the particular control signal of that cluster which operates that specific TV model or the specific older or newer TV, The other control signals of the cluster which are not meant for the particular model of older/newer TV in the hospital room are essentially ignored. The control signal cluster is generated by controller 16 very rapidly and thus presents little delay in operating a particular TV. That is, there is preferably very little delay between each of the individual control signals of the cluster. The inventive system can be moved very easily between the various models of hospital TVs and does not require any reconfiguration or retrofit to operate the different TV models. In that way, should there be a malfunction in the bed of the TV, another bed utilizing the inventive system can replace the malfunctioning bed, or alternatively, another TV may be installed without concern for the particular TV model and its compatibility with the bed. This provides a substantial savings in the time required to plan and maintain a hospital room, and further reduces the logistical problems that have existed in the past with respect to arranging beds and TVs in hospital rooms so that compatibility is maintained. Furthermore, the hospital does not have to use just one particular TV model or one particular bed, as long as all the beds utilized incorporate the inventive system.

Examples of the operation of the system, and the various selectable modes of one embodiment of the invention, will be helpful in understanding the invention. The operational modes of controller 16 are determined by processor 36 and in one embodiment by mode switch 44 coupled to the processor. Mode switch 44 is preferably a dip switch which allows for rapid configuration of controller 16 to tailor the operational mode of the system to a particular hospital environment. For example, if a hospital contains both old TVs and newer code-driven TVs, one mode might be selected, whereas if a hospital only has the older TVs, or only has newer, code-driven TVs, another mode might be selected. The selected mode may also depend on the kind of radio capabilities available. Therefore, the mode switch provides a degree of programmability so that a user may program the selected operating mode. Of course, other programming devices might also be used to select the operating mode.

Figure 3:
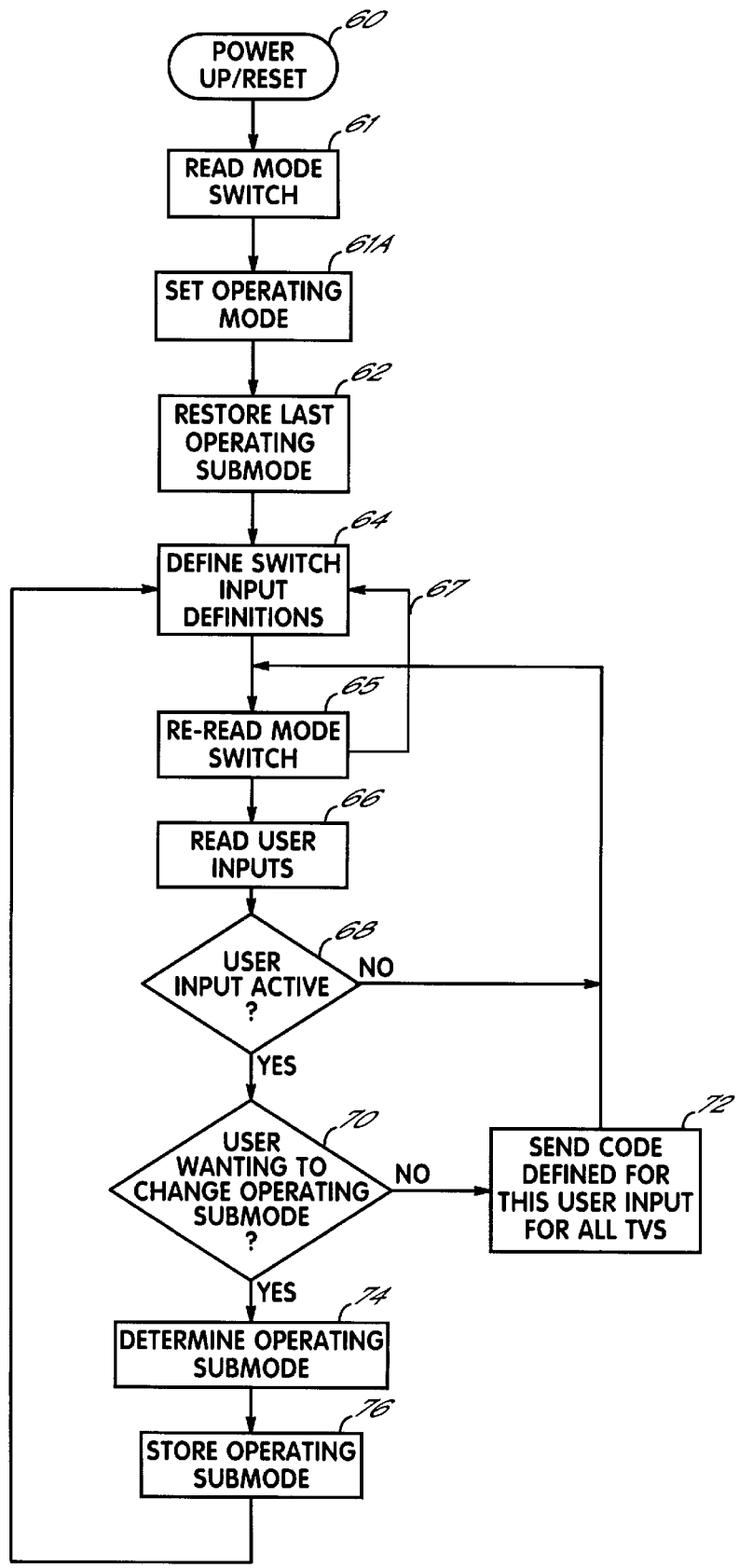
FIG. 3 is a flow chart illustrating the operation of one embodiment of the inventive system.

FIG. 3 illustrates a flow chart for the operation of the processor 36 of controller 16 in one embodiment of the invention. Upon powering the bed 30, the pillow speaker 32, or any other available power sources 20, 22, the processor is powered up and controller 16 is appropriately set to a reset mode (Step 60). The processor then reads the dip switch 44 (lines 46) to determine the operating mode selected (Step 61). Then the operating mode is set for the processor (Step 61A). The processor then returns to, or is restored to the last operating submode (Step 62) of the selected mode which will usually correspond to the particular hospital scenario, including the model of TV which is being controlled. Some of the operating modes of the invention, like Operating Mode 1 discussed below, have several submodes that may be used. Accordingly, if one of these modes is chosen, the processor will want to return to the proper submode in that mode. Processor 36 is therefore preferably configured to store current operating submodes and to remember the submodes for future operation even if power is removed.

Next, processor 36 defines the input switches (Step 64), depending upon the selected operating mode. That is, each of the input switches/buttons 34 from the bed 30 or pillow speaker 32 or other input device may initiate different operational functions of the TV 40 depending upon the operating mode of the controller 16. Next, the mode switch is again read (Step 65) to determine if the switch has been changed after start-up of the system. If the switch has been changed, a new mode is being requested, and new input switches must be defined (67). The processor 36 then polls the input devices (Step 66) and reads the respective input signals 12 to determine if a patient is trying to control the TV 40. If the user input is active (Step 68), such as if a button is pushed and/or a switch closed from the various input devices, then processor 36 will respond accordingly. If no user input is active, then the processor will simply re-poll or re-read the user inputs until one of the inputs becomes active as indicated in the flow chart loop in FIG. 3. The processor will also poll the mode switch to detect a mode change. If a user input is active, processor 36 will determine whether the user wants to change to a different submode within the current operating mode (Step 70). In at least one operating mode of the invention, a plurality of submodes are available for controlling TV 40. For example, an operating mode may provide control of both old TVs and newer, code-driven TVs, wherein one submode in that mode is dedicated to the old TVs and another submode is dedicated to the newer, code-driven TVs. Accordingly, in response to the user inputs 12, the processor may automatically change from one submode to another submode (Steps 74, 76) depending upon the model of TV which is to be controlled.

If a user input is active, but no operating mode or submode change is requested, the processor generates the proper relay control signals 38 for creating an appropriate control signal cluster 28 to control the TV (Step 72). As discussed further hereinbelow, the individual and sequentially generated control signals of each control signal cluster correspond to specific operational functions for a plurality of different hospital TV models. In the preferred embodiment of the invention, some of the particular input signals will generate a control signal cluster which has individual TV control signals which all relate to essentially the same or very similar operational functions for different TV models. For example, a TV ON input signal from the patient will generate a control signal cluster with a plurality of different ON control signals to turn on different TV models to be interfaced with the system. The actual TV 40 coupled to the inventive system will see a plurality of ON signals and will respond only to the ON signal that it recognizes.

If the processor 36 determines that the user is changing the operating mode to a different submode, the processor will determine that different operating mode or submode (step 74) and will store that operating mode or submode (Step 76). As a result, and as illustrated in FIG. 3, new switch inputs for the input devices will be defined (step 64). In one embodiment of the invention, the mode change or submode change provided by the controller 16 will be transparent to the user. For example, if the processor is currently in an operating mode which will allow it to operate both new and old televisions, but is in a submode which is directed to newer televisions, processor 36 will have to switch submodes in order to control an old TV. Therefore, in response to a TV ON input from the patient, for example, controller 16 will generate a control signal cluster for turning new TVs on. An old TV will not turn on and therefore the patient will generally provide a prolonged ON signal, such as by keeping the TV ON button depressed. The processor 36 will read the prolonged ON signal and will switch submodes to the old TV submode at which time the old TV will turn on.

Operating Mode 1

Figure 4:
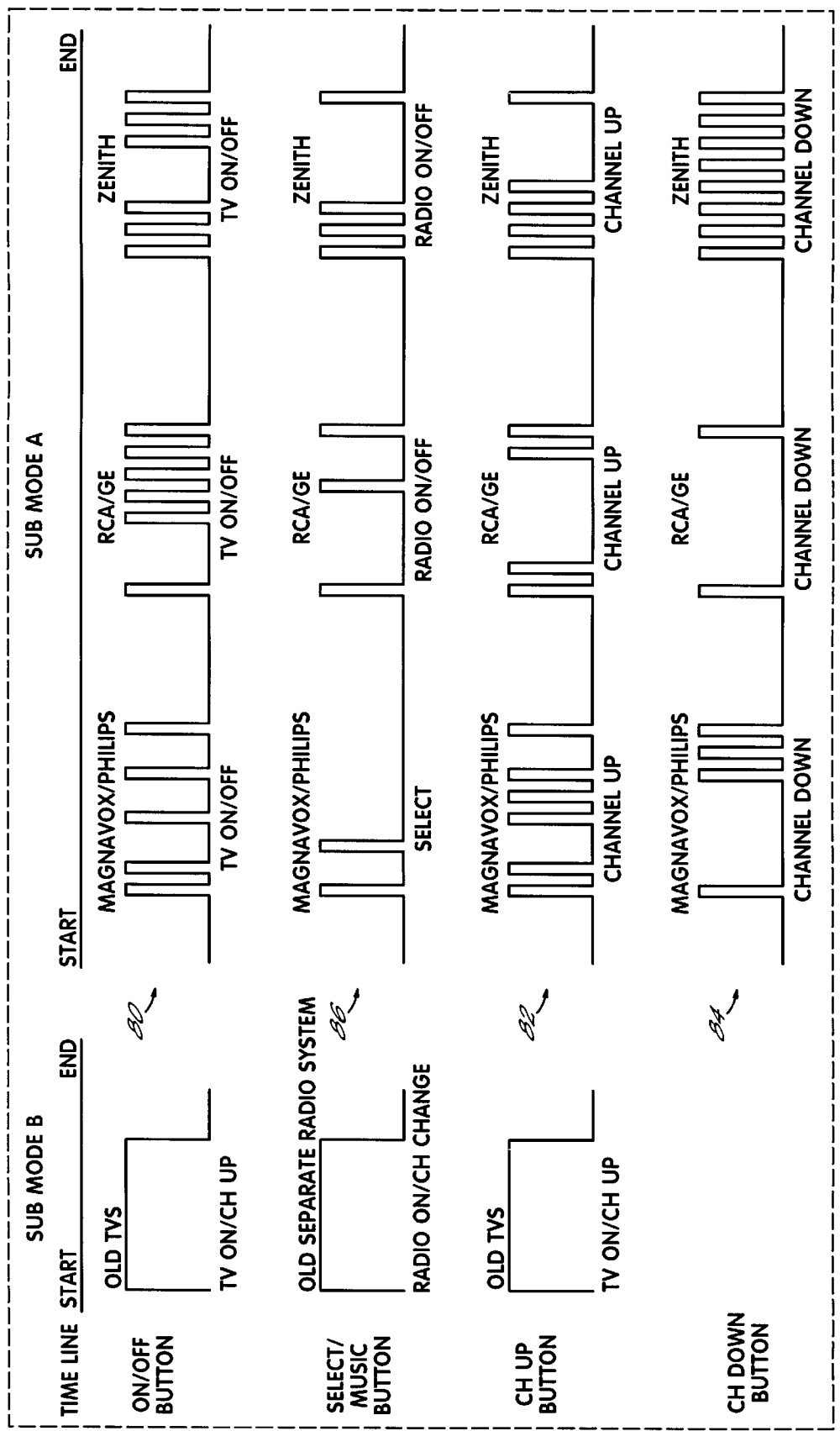
FIG. 4 is a control sequence diagram for operation of one embodiment of the inventive system.

Turning now to the various operating modes of one embodiment of the invention, FIG. 4 shows a simulated timing sequence with associated simulated control signal clusters for Operating Mode 1, illustrated with Submode A and Submode B. The actual control signals of the cluster may vary from the simulated signals shown by pulse width, number of pulses, and spacing between pulses. FIG. 4 illustrates four input buttons from an input device, although additional input buttons or switches may be added as appropriate for expanding the inventive system, as previously discussed. Furthermore, FIG. 4 discloses control signal clusters which have control signals for TV models designated Magnavox/Philips, RCA/GE and Zenith, although other manufacturers' codes might also be utilized in the control signal cluster, as appropriate. Magnavox is listed with Philips, and RCA is listed with GE, for example, because the hospital TV models having those brand names share similar control signals. For example, RCA brand TVs and GE brand TVs will share a similar control signal protocol On the left side of FIG. 4, the input buttons are designated as ON/OFF, CH UP, CH DOWN, and SELECT/MUSIC for turning the TV on and off, moving the channel up, moving the channel down, and accessing a radio feature or selecting some other operational function of the TV, respectively. When the ON/OFF switch or button 34 on the bed 30, pillow speaker 32, or other input device is pressed and the processor 36 is in Operating Mode 1 and Submode A, controller 16 sends a control signal cluster 80 to TV 40. Control signal cluster 80 includes a TV ON/OFF signal for each of Magnavox/Philips, RCA/GE, and Zenith. The TV model coupled to controller 16 sees the TV ON/OFF control signals of the cluster and will respond accordingly when it receives the appropriate control signal for that TV model. The remaining control signals for the cluster are ignored.

As illustrated in FIG. 4, the control signals are a series or string of spaced pulses. To that end, controller 16 provides the relay control signals 38 for opening and closing relay 42a to create the selected pulse strings and build the control signal cluster. Preferably, there is very little delay between the individual control signals of each cluster as shown in FIG. 4 by the simulated control pulses. Each time the ON/OFF button is pressed, the cluster 80 is sent. If the CH UP button is pressed, the controller will create cluster 82 which includes sequentially generated CHANNEL UP signals for moving the channel up for the different TV models. Similarly, if the CH DOWN button is depressed the control signal cluster 84 will include appropriate CHANNEL DOWN signals for moving the channel down for the available TV models. Both control signal clusters 82 and 84 will also be generated using relay 42a. Each time the CH UP and CH DOWN buttons are pressed, a channel change is made. Furthermore, if either button is held down the appropriate clusters 82, 84 are repeated to change the channel.

If the SELECT/MUSIC button is pushed the control signal cluster 86 created will include control signals for different operational functions depending upon the TV model. For example, for Magnavox/Philips TVs, cluster 86 will include the control signal for selecting a particular feature of the TV, such as a channel guide or other available operational function, while it will turn on a radio, such as an FM radio, for code-driven RCA/GE TVs and Zenith TVs. When the radio is on, the CH UP and CH DOWN buttons are used to change the available channels for the code-driven TVs with radio features. When the radio has been turned on, a subsequent depression of the SELECT/MUSIC button will turn the radio off. Cluster 86 will also be generated through relay 42a.

To turn the television off once it has been turned on, the patient would touch the ON/OFF button and cluster 80 would again be generated. Generally, the ON and OFF codes for code-driven hospital TVs are the same. Therefore, the signal for ON is the same as the signal for OFF. Preferably, the time between each individual control signal of a cluster is small so that the patient does not have to wait a significant amount of time to control the TV each time an input button is pressed. The buttons have been designated for the most-used particular operational functions of the TV. However, the expandability of the inventive system may require that additional buttons be added. Furthermore, while buttons such as the CH UP button will provide a cluster of CHANNEL UP signals, one signal for each TV model, other buttons may provide mixed control signals for different operational functions, such as the SELECT/MUSIC button which turns on the radio for some TVs and selects other options, such as a channel guide, for other TVs. It will be appreciated that the actual user input buttons may be marked with a designation other than ON/OFF, CH UP, CH DOWN, etc., depending upon the available options for the TV and to prevent patient confusion. For example, if the TV is only capable of radio functions with the SELECT/MUSIC button, the button might simply be designated MUSIC.

The control signal clusters 80, 82,84, and 86 are generated within Submode A of Operating Mode 1, which is directed to newer, code-driven TVs. However, Operating Mode 1 will also allow the inventive system to operate old TVs. Old TVs essentially may be controlled with a single button, which is depressed to turn the TV on, to move up through the channels, and to turn the TV off when the last viewing channel has been passed. Referring to Submode B in FIG. 4, the input buttons are configured for old TV operation. However, for operating old TVs, controller 16 must be in Submode B. In one embodiment of the invention, the controller may be switched to Submode B according to step 70 of FIG. 3 by holding the ON/OFF button down continuously for approximately 7–8 seconds. The length of time in which the ON/OFF button is held down is not particularly critical except that it is desirable to prevent inadvertent entry into Submode B if the patient holds down the ON/OFF button while trying to operate a codedriven TV. It has been determined that a delay of 7–8 seconds would be suitable for preventing inadvertent switching between the submodes. When the processor senses that the ON/OFF button has been held down for 7–8 seconds, it will switch to Submode B, and the ON/OFF button will generate a signal through relay 42a for turning the old TV on, as illustrated in FIG. 4. Since the signal for turning the television on, moving up through the channels, and turning the television off is essentially the same signal, the CH UP button, when depressed, will cause the controller 16 to produce a similar signal through relay 42a. While the signals for turning an old TV on and off and moving the channel up is essentially created by the opening or closing of a relay to create a continuous signal rather than a pulsed code, the signal will still be designated as a "control signal" in the nomenclature of this invention similar to the pulse codes for the newer code-driven TVs. Once the processor 36 has been placed in Submode B, it will remain in that submode. In that way, each subsequent depression of the ON/OFF button does not have to be continuous for 7–8 seconds to turn the television on. The submode will preferably be remembered by the processor (Step 76, FIG. 3).

In Submode B, the CH UP button produces the same effect as the ON/OFF button in the sense that once the television is on, depressing the CH UP button moves the channel up, and will turn the TV off after the last channel has been passed. Once the TV is on, depressing the ON/OFF button will also change the channels until the TV turns off. When using the ON/OFF button and the CH UP button, relay 42a will be closed as long as the button is pressed for controlling the TV.

The SELECT/MUSIC button in Submode B of Operating Mode 1 causes the processor 36 to drive relays 42b and 42c. The relays are held closed as long as the SELECT/MUSIC button is pressed (see FIG. 4.). For hospital TVs having a separate radio system, the radio will be controlled through the output of relay 42b, designated as RL and the output of relay 42c, designated as RR. The common line R− for the two relays 42b and 42c are tied together. When the SELECT/MUSIC button is pressed, the radio is turned on, and if the button is held, the radio steps through the available listening channels. When it passes the last listening channel it will turn off, and will turn on again with a subsequent depression of the SELECT/MUSIC button. Alternatively, the TV may switch to TV audio after the last radio channel is passed, depending on the TV being controlled. With the old TVs the radio system is generally independent of the TV and thus relays 42b and 42c are used instead of the television control relay 42a.

In Operating Mode 1, the individual switch 44a of mode switch 44 is open, and the common lines for the TV (TV−) and the radio (R−) are not tied together as they are for other operating modes. Therefore, in Operating Mode 1, old TVs and associated radios and newer, code-driven TVs and radio systems may be operated without requiring special programming or configuring of a bed or pillow speaker, regardless of the TV model available. The three switches 44b, 44c, 44d of the mode switch 44 are coupled to processor 36 to vary the operating mode of the processor. Therefore, the three switches provide the binary possibility of eight operating modes. Of course, additional switches may be added to mode switch 44 as appropriate for expanding the available operating modes of processor 36.

In one possible embodiment, to move back to Submode A from Submode B, the CH DOWN button is pressed or held for 7–8 seconds to prevent inadvertent switching back to Submode A. Alternatively, a SELECT/MUSIC button may be used to switch submodes. The processor 36, then switches back to Submode A for operating code-driven TVs.

Operating Mode II

In a second Operating Mode, the system 10 is operable for controlling a Zenith three-wire system TV. In such a system, three dedicated wires are used. One wire is used for turning the TV on and off, one wire is used for changing the channel up, and the other wire is used for changing the channel down. When Operating Mode II is chosen by using switches 44b, 44c, and 44d, the ON/OFF button will drive relay 1 (closed as long as button is pressed), and will turn the TV on and off. Use of the CH UP button will cause the processor 36 to drive relay 42b (closed as long as button is pressed) to change the channel up, and the CH DOWN button causes processor 36 to drive relay 42c (closed as long as button is pressed) to change the channel down. In Operating Mode II the SELECT/MUSIC button does not control the TV. Referring to FIG. 2, switch 44a of the mode switch 44 must be closed to couple the TV common line (TV−) and the radio common line (R−) together for proper operation.

Operating Mode III

Certain hospitals may have only old TVs and a separate radio system. Therefore, it may be desirable to have the controller operate only for old TVs and the radio system. To that end, Mode III may be chosen with mode switch 44. In Mode III, the ON/OFF button drives relay 1 and turns the television on, moves the channel up, and turns the television off, as illustrated in FIG. 4 for Submode B of Operating Mode I. Similarly, the CH UP button drives relay 1 for operating the TV like the ON/OFF button. The CH DOWN button and the SELECT/MUSIC button both drive relays 2 and 3 to toggle the radio on and off and change the channel as described above for Submode B in Operating Mode I. For a system which will only operate in mode 3, the labeling of the input CH DOWN might be changed so as not to confuse the patient. Switch 44a is open in Operating Mode III.

Operating Mode IV

For those facilities which only utilize newer, code-driven TVs but with separate radio systems, Mode IV may be chosen with mode switch 44. In Mode IV, the ON/OFF button turns the television on and off through control signal clusters, like cluster 80 shown in FIG. 4. The CH UP and CH DOWN buttons also generate control signal clusters like clusters 82 and 84, respectively. The SELECT/MUSIC button drives relays 42b and 42c (closed as long as button is pressed). In that way, the separate radio may be toggled on and off and the channel may be changed as discussed with Operating Mode III. In Operating Mode IV, switch 44a is open. Should it be desirable for also providing flexibility to operate a code-driven TV with radio features, the SELECT/MUSIC button might also provide a Radio ON/OFF code, as shown in cluster 86, for certain TV models.

Operating Mode V

In Operating Mode V, controller 16 is selected for use with hospitals having only newer, code-driven TVs with or without radio features. Therefore the ON/OFF, CH UP and CH DOWN buttons operate as discussed in Mode 1/Submode A. When the SELECT/MUSIC button is depressed, the controller sends a RADIO ON/OFF code for RCA/GE and Zenith TVs, and the SELECT signal for Magnavox/Philips (cluster 86). However, the relays 42b and 42c are not operated because they are not needed due to the lack of any separate radio system.

Operating Mode VI

In accordance with the principles of the present invention, a hospital facility may have only one TV model from a single manufacturer. In such a case, it may be desirable to provide a controller in which the operating mode is specifically directed to that TV model, but which includes the other universal TV control capabilities of the invention should the hospital acquire other TV models in the future.

Accordingly, Mode VI of the processor may generate control signal clusters which have individual control signals and pulse strings for only one particular model of TV. For example, a hospital might have only RCA/GE TVs. Accordingly, when the processor 36 and controller 16 of the invention are in Mode VI, the controller would generate codes directed only to RCA/GE for turning a TV on and off, changing channels, and operating the radio functions of the code-driven TV. For example, an ON/OFF button might generate a cluster having only TV ON/OFF codes for RCA/GE code-driven TVs. In that way, the control provided by the inventive system may be more specifically tailored, thus eliminating extraneous control signals and/or control functions. Of course, the mode switch could very easily be changed, such as throwing a different combination on dip switch 44 to provide an expanded control capability of the system in accordance with the principles of the present invention, should it be necessary to control additional TV models beyond the original single TV model. The operation of the controller 16 would be similar to that described above, except that the control signal clusters would only have control signals for one particular manufacturer, such as RCA and GE.

Additional Modes

Similar to Operating Mode VI, additional operating modes are utilized with the inventive system, wherein each operating mode is tailored to a specific TV model, such as a Zenith model, RCA/GE models, and/or Magnavox/Philips models, or an even more specific model, such as a particular model of Magnavox or RCA. For example, a hospital may have only one particular Magnavox model to control, and thus may desire a system directed to that Magnavox model. In such an operating mode, the control signal clusters contain only control signals for the selected model of TV. That is, the control signal clusters will only have the Magnavox control signals therein. Accordingly, the invention provides adaptability to a very wide variety of different hospital TV control scenarios and necessary control protocols. With a quick changing of the mode switch 44, any one of a number of different operating modes may be selected, depending upon the hospital scenario and the particular model of TV to be controlled. No additional programming or hardwiring will be necessary.

In an alternative embodiment of the invention, the mode switch 44 might be eliminated while a generally a similar hardware configuration as shown in FIG. 2 would still be utilized. In the alternative embodiment, the control signal cluster takes into account individual control signals for both newer and older TVs, as well as TVs from different manufacturers. Therefore, different modes will not be necessary for operating older and newer TVs. Of course, the mode switch 44 may still have use in a number of installations, particularly those requiring wired radio, or alternatively for CHANNEL UP and CHANNEL DOWN signals for some hard-wired TV models, as described above. The alternative embodiment will further eliminate the need for the controller to remember its last sub-mode state, such as upon power loss, thus reducing the control complexity and overall cost of the system.

The alternative embodiment takes into account that newer, codedriven hospital TVs are manufactured for backward compatibility with control systems for older TVs due to the installed single-button controllers currently predominant in the hospital market. That is, the newer TVs must also recognize the control signals for older TVs so that they may be used in existing hospital facilities with only older command hardware. However, older style hospital TVs do not recognize the new code-driven TV commands. By incorporating the control signals for newer and older TVs into a single cluster, the need for mode switch configuration, patient interfacing with the mode switch, and storing of the sub-mode information is generally eliminated, thus reducing the complexity of the control system.

Figure 5:
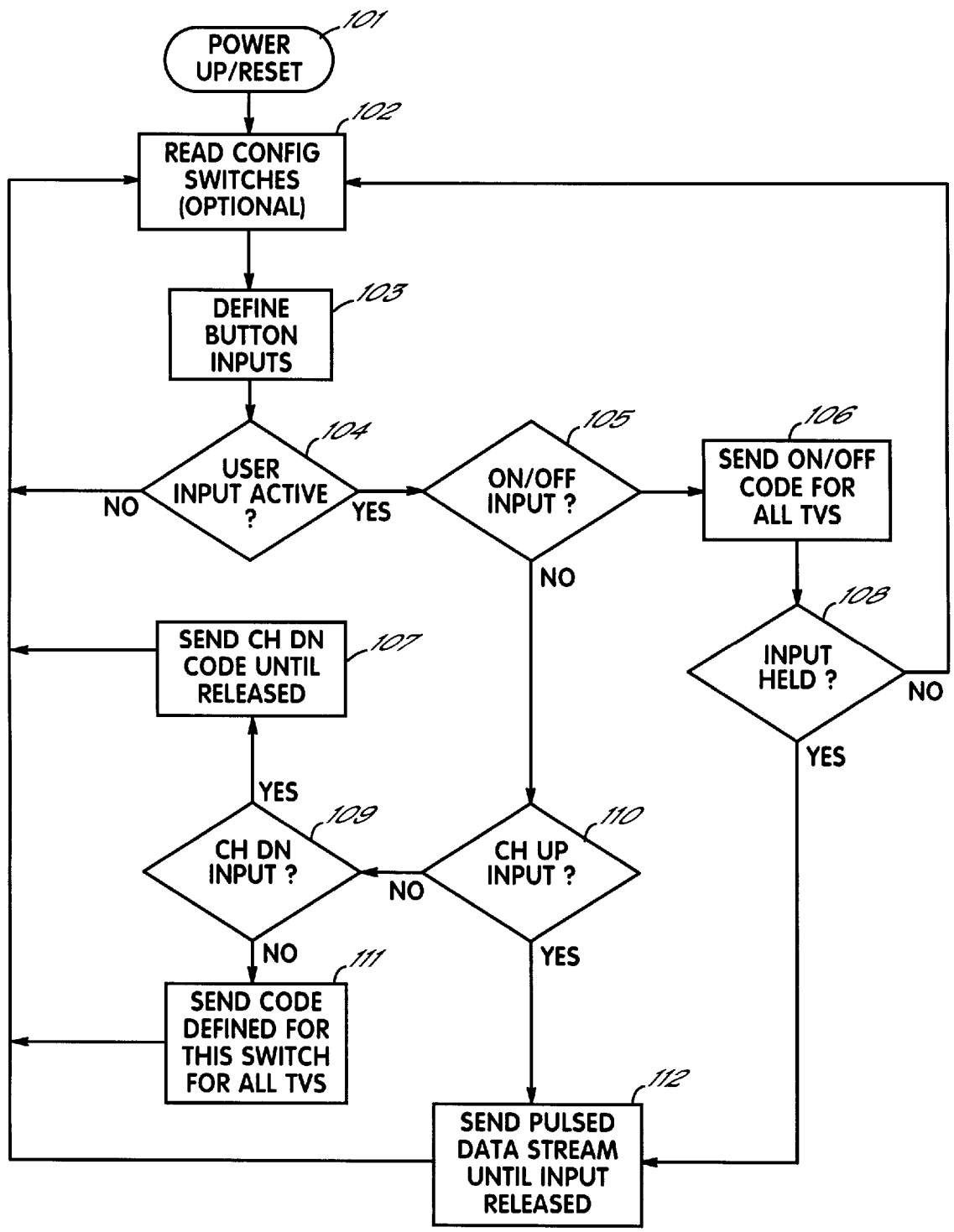
FIG. 5 is a flow chart illustrating the operation of one embodiment of the inventive system.

FIG. 5 is the flow chart depicting the operation of the processor for the alternative embodiment of the invention. Upon powering the system, the controller 16 is set to a reset mode (Step 101), similar to the reset mode in the embodiment discussed above. The processor 16 then may read certain configuration switches to determine the interface characteristics of the system. For example, a configuration switch might define special installations, such as wired radio systems, or those systems that have wired CHANNEL UP and CHANNEL DOWN signals, as previously disclosed. In such a scenario, the configuration switches might handle some of the tasks handled by a mode switch. As noted, the alternative embodiment preferably eliminates mode switches and thus the reading of the configuration switch (Step 102) would be optional, depending upon the hardware configuration. Next, the processor 16 defines the various button switch inputs (Step 103). The definition of the button inputs may also depend upon the setting of any optional configuration switches, although they may be hardwired. Since there will preferably be no mode switching within the embodiment disclosed in FIGS. 5–8, it is not necessary to continue to read and re-read a mode switch and to restore the last operating sub-mode of the system.

Figure 6:
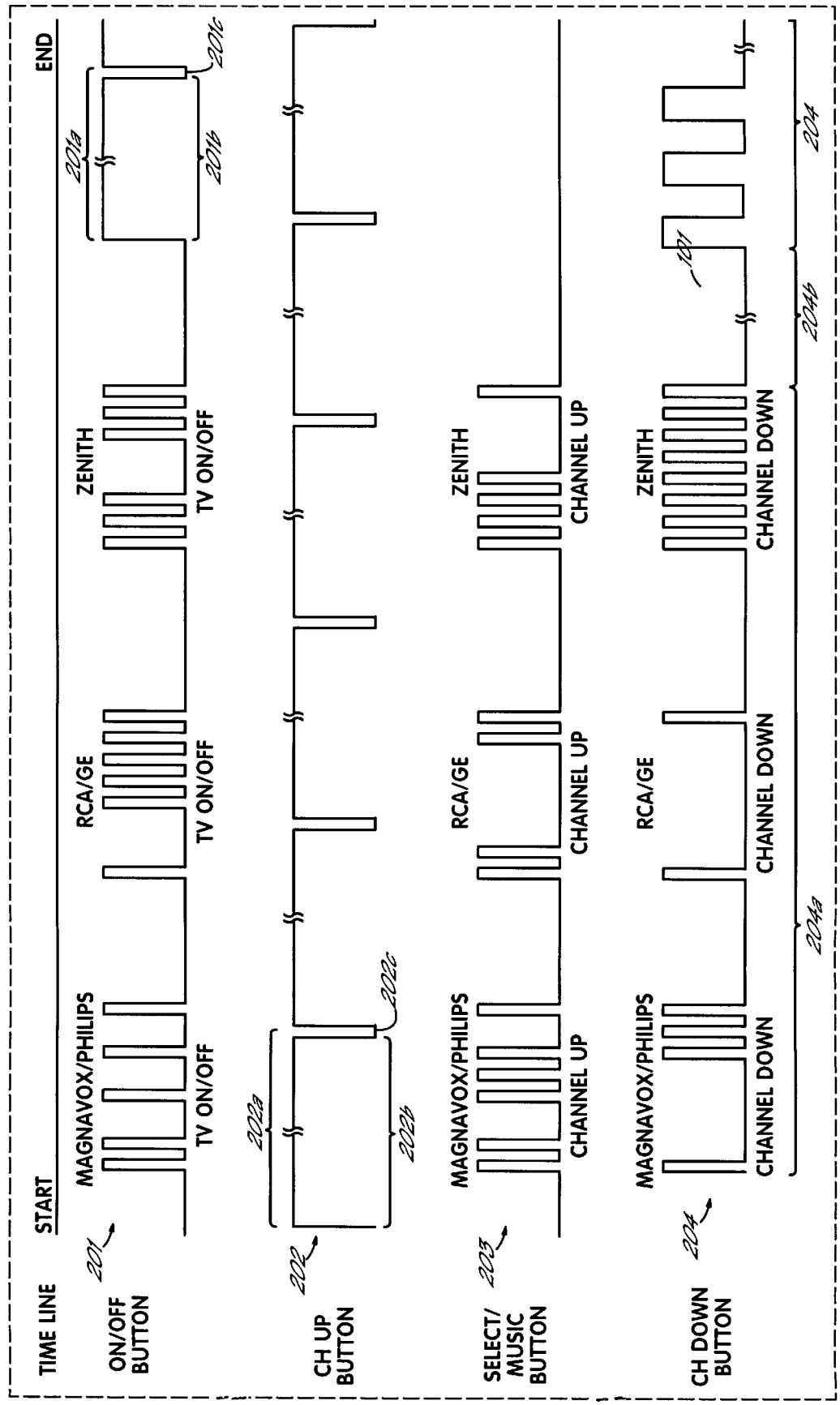
FIG. 6 is a control sequence diagram for operation of one embodiment of the inventive system.

After power to the system, the processor 16 then polls the various button inputs (Step 104) to determine if a user input is active and a user is interfacing with the system, i.e., a user is pressing a control button for a TV. If no button input is active, the processor 16 returns to read any optional configuration switches (Step 102) or to define the button inputs (Step 103) as shown in FIG. 5. If one of the user inputs is active, as determined by a YES answer to Step 104, then the processor checks to see if the active input is the ON/OFF button input (Step 105). If the ON/OFF button input is active, the processor 16 then sends the appropriate ON/OFF control signal cluster for the particular TVs coupled to the system, such as those manufactured by Magnavox/Philips, RCA/GE, and Zenith. Referring to FIG. 6, the ON/OFF cluster is shown as cluster 201 in FIG. 6. The individual control signals of the cluster are sent consecutively and sequentially with a short delay between each, as discussed above. Of course, the sequence order of the various different manufacturers may be varied. For example, the Zenith control signal may be sent as the first signal in the cluster.

In accordance with one aspect of the alternative embodiment of the invention, the control signal cluster 201 also may include individual control signals for older TVs, as well as the newer, code-driven TVs of the various manufacturers. Turning to FIG. 5, the processor 16 will send cluster 201 to turn the television on or off (Step 106). Processor 16 will then continue to monitor the input line to see if the ON/OFF button input is still active (Step 108), ie., the system determines if a user is holding the button down or in an engaged position. If it is not, processor 16 returns to steps 102 and 103, as shown in FIG. 5. However, if the ON/OFF button input is still active, the processor 16 sends a pulsed data stream (Step 112) until the ON/OFF button is released. Referring to FIG. 6, the pulsed data stream 201a is shown which includes a high period 201b that is approximately 600 milliseconds in duration and a low period 201c that is approximately 20 milliseconds in duration. The pulsed data stream 201a is operable to turn on an older TV which does not recognize the other coded control signals of cluster 201. Upon receiving the pulsed data stream 201a, an older TV will turn on. Furthermore, the TV will begin to sequence up in channels if the ON/OFF button input is still engaged and the data stream is continuously repeated. The upward sequencing through the viewing channels is currently how older TVs will operate upon receiving the repeated pulsed data stream 201 a. The pulsed data stream 201a is repeated as long as the ON/OFF button input is held (Step 112). In that way, control signal cluster 201 is capable of operating both newer and older style TVs without the requirement of a mode selection switch, or mode selection through a user interface. Therefore, the operation of the ON/OFF control for any kind of TV, older or newer, code-driven, is transparent to a user.

When the ON/OFF button input is active, the processor 16 sends all of the various coded control signals of the cluster in their entirety for all applicable TV manufacturers, even if the user releases the ON/OFF button input before all of the individual control signals are sent. In that way, any newer code-driven television will be turned on, as long as the specific control signal for the TV make/model is within the cluster 201. If nothing occurs upon engaging the ON/OFF button (indicating that an older TV is being used), the user will usually continue to engage the ON/OFF button input until something does occur. When the button input is continuously engaged so that the input signal generated by the button input continues for a predetermined amount of time after the control signals are sent, the pulsed data stream 201a will be sent by the controller 16 to turn on or off the older TV. In that way, the data stream 201 a is added to cluster 201 as part of the cluster. If a newer TV is utilized and turns on through one of the coded control signals in cluster 201, and the user still continues to engage the ON/OFF button input for a predetermined time, the pulsed data stream 201a will be sent by the controller and a new model TV will also begin to sequence up through channels. This is because newer, code-driven TVs are backward compatible to the control process of an old TV, as discussed above. That is, the newer TVs see the pulsed data stream as a user input that is consecutively pressing a single button input. Therefore, the newer TVs will ramp up through the channels effectively at a 620 millisecond rate, according to the length of the pulsed data stream 201a. The older TVs will also ramp up through channels if the button input remains active after the TV is on. The pulsed data stream 201a will be immediately terminated as soon as the ON/OFF button input is inactive or disengaged. Therefore, either a newer, code-driven TV or an older, single-button interface TV will respond to the ON/OFF button input of the invention. Consecutive presses and releases of the ON/OFF button will toggle a newer TV on and off as desired.

Returning to FIG. 5, if the ON/OFF button input is not active, the processor checks to see if the CHANNEL UP button input is active (Step 110). If the CHANNEL UP button input is active, the processor 16 sends a signal cluster 202 which consists of a plurality of pulsed data streams 202a. Referring to FIG. 6, the pulsed data streams 202a are similar to the pulsed data stream 201a and include approximately a 600 millisecond high period and a 20 millisecond low period. As mentioned above, newer TVs are made to be backward compatible with the older TVs such that the newer TVs will also recognize the pulsed data stream 202a as a CHANNEL UP control command, similar to the older TVs. As illustrated in FIG. 5, older TVs turn on and proceed through the channels in response to the same data stream. Therefore, both newer TVs and older TVs will scroll upwardly through the available channels upon receiving the cluster 202. The pulsed data stream 202a of cluster 202 will essentially be repeated continuously as long as the CHANNEL UP button input is active (Step 112). The invention will create an upward scrolling through available channels at about a 600 millisecond interval or rate.

If the CHANNEL UP button input is not active, the processor 16 then checks to see if the CHANNEL DOWN button input is active (Step 109). If the CHANNEL DOWN button input is active, the processor 16 sends the cluster 204 which includes the various coded control signals for the TVs. The coded control signals of cluster 204 initiate the appropriate command (CHANNEL DOWN) for the newer style TVs, as indicated by reference numeral 204a. The processor will send all of the individual command signals for the various different TV models in their entirety, even if the user releases the CHANNEL DOWN button before all of the individual signals have been sent. If the user continues to hold or engage the CHANNEL DOWN button, the codes will be followed by a delay period 204b that pads the time period such that the combination of control signals 204a and the delay 204b is approximately 600 milliseconds long. If the CHANNEL DOWN button input is held active, the processor continues to send the full set of CHANNEL DOWN commands 204c repeatedly in the sequence (Step 107). This allows a user to scroll through the viewing channels by maintaining the CHANNEL DOWN button input active when the TV that is coupled to the control system is a newer style, code-driven TV. Older style TVs will not respond to the control signal cluster 204. The 600 millisecond time period created by the individual control signals 204a and the delay 204b provides the user the capability of scrolling both CHANNEL UP and CHANNEL DOWN through the available viewing channels of a newer TV at essentially the same rate (i.e., around 600 milliseconds), if either button input is held active. Therefore, the user may actively move through the channels, up or down, at the same speed.

If the CHANNEL DOWN button input is not active, the system may send a code defined for a particular switch which is active (Step 111). As mentioned above, other options may be available for controlling a TV. For example, the system might incorporate a SELECT/MUSIC button input. Referring to FIG. 6, if the SELECT/MUSIC button input is active, a control signal cluster 203 is generated, which consists of the appropriate command SELECT or RADIO ON/OFF for newer TVs. If an older TV is coupled to the control system, and the SELECT/MUSIC button input is active, the TV will not respond to the cluster 203. Again, for the SELECT/MUSIC button input, all of the commands for the various manufacturers will be sent, even if the user releases the button before all of the individual code signals of the cluster 203 have been sent.

Figure 7:
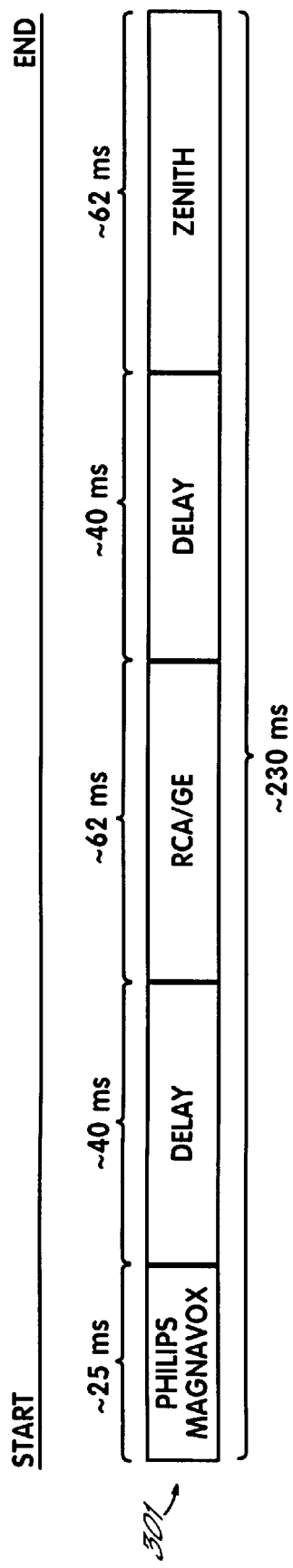
FIG. 7 is a timing diagram for the control sequence illustrated in FIG. 6.

FIG. 7 is a timing diagram of one embodiment of the control signal cluster, and the spacing delays associated with each command. Reference numeral 301 represents a particular cluster wherein each of the manufacturer's control signals and their durations for the newer code-driven TVs are shown. Essentially, a full control signal cluster including the three different control signals described herein will have a length of approximately 230 milliseconds, including 40 millisecond delay periods between the individual coded control signals. Of course, other clusters may have different lengths in accordance with the principles of the invention.

Figure 8:
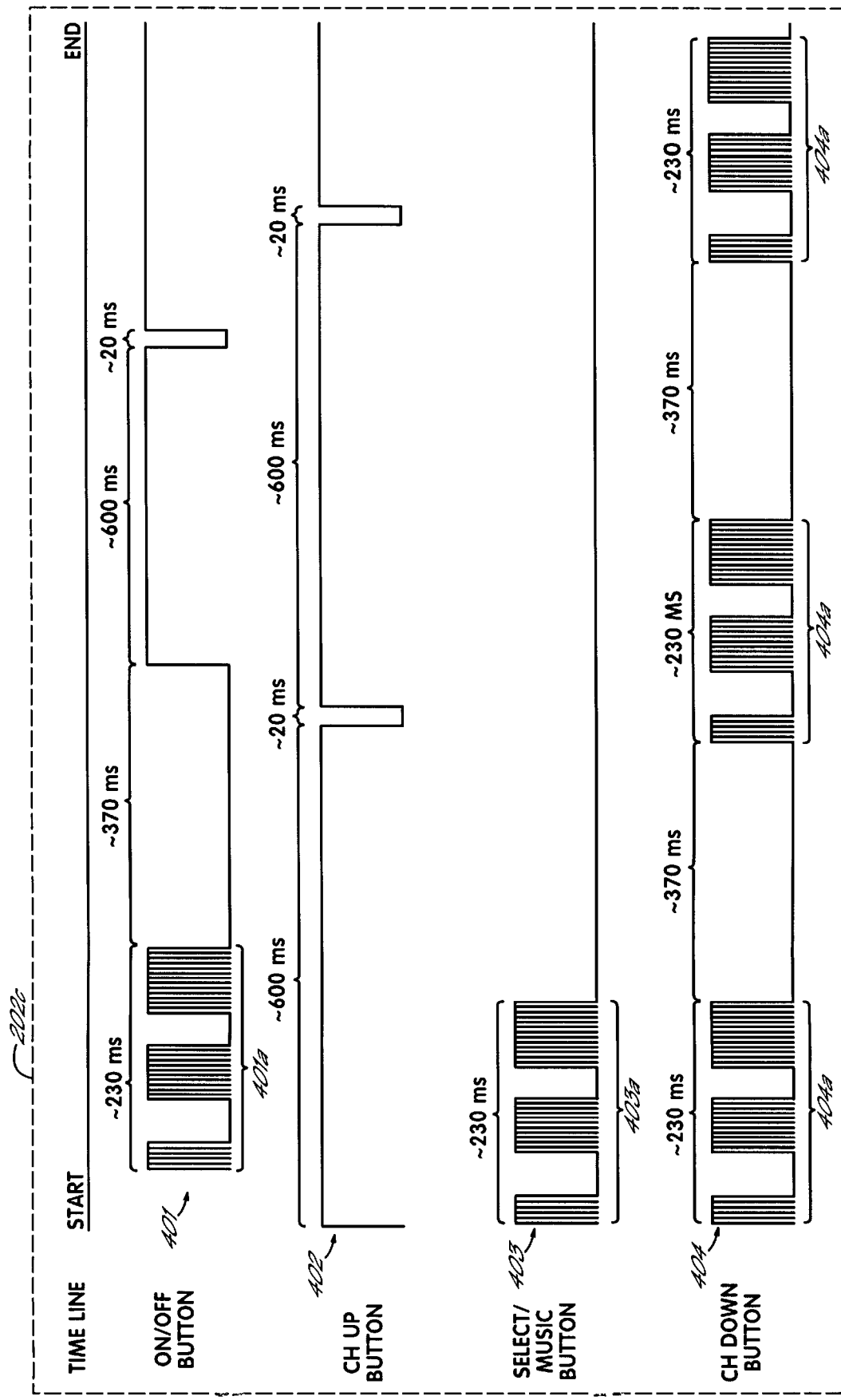
FIG. 8 is a control sequence similar to FIG. 6 for one embodiment of the invention.

Referring to FIG. 8, another timing diagram for operation of one embodiment of the invention is illustrated. The various control signal clusters are shown for selectable button inputs. As may be seen, the clusters for the ON/OFF, CHANNEL UP and CHANNEL DOWN, as indicated by reference numerals 401, 402, and 404, respectively, are all appropriately padded with a time delay of approximately 370 milliseconds such that the overall length of each cluster, in addition to the 230 milliseconds required for the control signals, indicated respectively as 401a, 403a, and 404a, will essentially have a length which matches the 600 millisecond length of the pulsed data stream utilized with the ON/OFF and CHANNEL UP inputs. The control signal cluster 403 for the SELECT/MUSIC input, will only include a single 230 millisecond control signals 403a. Of course, various different signal cluster durations and delays may be utilized in accordance with the principles of the invention.

While the present invention has been illustrated by the description of the embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details representative apparatus and method, and illustrative examples shown and described. Accordingly, departures may be made from such details without departure from the spirit or scope of applicant's general inventive concept.

What is claimed is:

1. A television control system for control of television models of a predetermined plurality of different models of hospital televisions without requiring patient programming of the system for a particular models the system comprising:

an input device operable for generating at least one television input signal corresponding to a television input from a person;

a controller configured for interfacing with a hospital television, the controller operable for generating a cluster of control signals, in response to said television input signal and each time said generated television input signal is received by the controller, to operate different models of hospital televisions;

the control signal cluster corresponding to at least one specific operational function of a hospital television and including a predetermined set of sequentially generated, individual control signals, each of the individual control signals of the cluster corresponding to at least one model of a predetermined plurality of different models of hospital televisions and the cluster including individual control signals for various models of the predetermined plurality of different models;

the controller further operable for generating a data stream as part of the control signal cluster when said input signal continues for a predetermined time after the predetermined set of control signals of the cluster is generated, the data stream corresponding to an operational function of a hospital television which is not responsive to said control signals from said predetermined set;

the control system automatically operating any one of a variety of different models of hospital televisions in response to a patient input.

2. The television control system of claim 1 wherein said controller is operable for generating control signals for turning on a hospital television, said control signal cluster including sequentially generated ON signals for a plurality of different models of hospital televisions.

3. The television control system of claim 1 wherein said controller is operable for generating control signals for turning off a hospital television, said control signal cluster including sequentially generated OFF signals for a plurality of different models of hospital televisions.

4. The television control system of claim 1 wherein said controller is operable for generating control signals for varying viewing channels of a hospital television, said control signal cluster including sequentially generated CHANNEL signals for a plurality of different models of hospital televisions.

5. The television control system of claim 4 wherein said CHANNEL signals include CHANNEL UP signals to operate a television to move up through available viewing channels of a hospital television.

6. The television control system of claim 4 wherein said CHANNEL signals include CHANNEL DOWN signals to operate a television to move down through available viewing channels of a hospital television.

7. The television control system of claim 1 wherein said controller is operable for generating control signals for operating a radio device associated with a hospital television, said control signal cluster including at least one RADIO signal corresponding to a particular model of hospital television.

8. The television control system of claim 1 wherein said controller is operable for generating control signals for selecting an operational function from available television operational functions, said control signal cluster including at least one SELECT signal corresponding to a particular model of hospital television.

9. The television control system of claim 1 wherein said controller comprises a processor for processing said input signal to generate said control signals.

10. The television control system of claim 1 wherein said controller comprises a relay, the relay being opened and closed to generate said control signals.

11. The television control system of claim 1 wherein said control signal cluster includes delay periods therein between the control signals.

12. The television control system of claim 1 wherein said input device is operable for generating a plurality of different input signals and said controller is operable for generating different control signals for a plurality of different operational functions of hospital televisions in response to the different control signals, the different control signals being configured to have generally the same effective duration so that the different operational functions of the televisions may be operated at effectively the same rate.

13. A hospital bed for controlling television models of a predetermined plurality of different models of hospital televisions located proximate the bed without requiring patient programming of the bed for a particular model, the hospital bed comprising:

a frame and a support surface coupled to the frame to receive a person;

an input device operable for generating at least one television input signal corresponding to a television input from a person;

a controller configured for interfacing with a hospital television, the controller operable for generating a cluster of control signals, in response to said television input signal and each time said generated television input signal is received by the controller, to operate different models of hospital televisions;

the control signal cluster corresponding to at least one specific operational function of a hospital television and including a predetermined set of sequentially generated, individual control signals, each of the individual control signals of the cluster corresponding to at least one model of a plurality of different models of hospital televisions and the cluster including individual control signals for various models of the predetermined plurality of different models;

the controller further operable for generating a data stream as part of the control signal cluster when said input signal continues for a predetermined time after the predetermined set of control signals of the cluster is generated, the data stream corresponding to an operational function of a hospital television which is not responsive to said control signals from said predetermined set;

the control system automatically operating any one of a variety of different models of hospital televisions in response to a patient input.

14. The hospital bed of claim 13 wherein said controller comprises a processor for processing said input signal to generate said control signals.

15. The hospital bed of claim 13 wherein said controller comprises a relay, the relay being opened and closed to generate said control signals.

16. A hospital pillow speaker to be used with a hospital bed for controlling television models of a predetermined plurality of different models of hospital televisions located proximate the bed without requiring patient programming of the pillow speaker for a particular model, the pillow speaker comprising:

a body including an interface surface for interfacing with a person;

a plurality of input devices available at the interface surface and operable for generating at least one television input signal corresponding to a television input from a person;

a controller configured for interfacing with a hospital television, the controller operable for generating a cluster of control signals, in response to said television input signal and each time said generated television input signal is received by the controller, to operate different models of hospital televisions;

the control signal cluster corresponding to at least one specific operational function of a hospital television and including a predetermined set of sequentially generated, individual control signals, each of the individual control signals of the cluster corresponding to at least on model of a predetermined plurality of different models of hospital televisions and the cluster including individual control signals for various models of the predetermined plurality of different models;

the controller further operable for generating a data stream as part of the control signal cluster when said input signal continues for a predetermined time after the predetermined set of control signals of the cluster is generated, the data stream corresponding to an operational function of a hospital television which is not responsive to said control signals from the predetermined set;

the control system automatically operating any one of a variety of different models of hospital televisions in response to a patient input.

17. The pillow speaker of claim 16 wherein said controller comprises a processor for processing said input signal to generate said control signals.

18. The pillow speaker of claim 16 wherein said controller further comprises a relay operably coupled to said processor, the processor operable, in response to said input signal, to open and close the relay to generate said control signals.

19. The pillow speaker of claim 16 wherein said controller comprises a relay, the relay being opened and closed to generate said control signals.

* * * * *